US011706098B1

(12) United States Patent
Chalmers

(10) Patent No.: US 11,706,098 B1
(45) Date of Patent: *Jul. 18, 2023

(54) CLOUD-BASED COMPUTING NETWORK STRUCTURING SYSTEMS AND METHODS

(71) Applicant: United Services Automobile Association (USAA), San Antonio, TX (US)

(72) Inventor: Timothy Blair Chalmers, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/853,414

(22) Filed: Jun. 29, 2022

Related U.S. Application Data

(63) Continuation of application No. 17/330,891, filed on May 26, 2021, now Pat. No. 11,394,619.

(60) Provisional application No. 63/031,735, filed on May 29, 2020.

(51) Int. Cl.
*G06F 15/16* (2006.01)
*H04L 41/12* (2022.01)
*H04L 41/0893* (2022.01)
*H04L 9/40* (2022.01)
*H04L 41/0823* (2022.01)

(52) U.S. Cl.
CPC .......... *H04L 41/12* (2013.01); *H04L 41/0823* (2013.01); *H04L 41/0893* (2013.01); *H04L 63/0209* (2013.01); *H04L 63/101* (2013.01); *H04L 63/104* (2013.01); *H04L 63/108* (2013.01)

(58) Field of Classification Search
CPC . H04L 41/12; H04L 41/0823; H04L 41/0893; H04L 63/0209; H04L 63/101; H04L 63/104; H04L 63/108
See application file for complete search history.

(56) References Cited

U.S. PATENT DOCUMENTS

| 5,826,014 A * | 10/1998 | Coley | H04L 63/1458 726/12 |
|---|---|---|---|
| 10,666,679 B1 * | 5/2020 | Block | H04L 63/1425 |
| 2007/0204145 A1 * | 8/2007 | Bunn | H04L 63/0281 713/152 |
| 2019/0182213 A1 * | 6/2019 | Saavedra | H04L 63/0236 |

* cited by examiner

*Primary Examiner* — Normin Abedin
(74) *Attorney, Agent, or Firm* — Fletcher Yoder P.C.

(57) ABSTRACT

Embodiments are described herein for systems and methods for continuously monitoring a network structure of one or more networks using a cloud-based network monitoring system, and rearranging, using the cloud-based network monitoring system, the network structure of the one or more networks to protect confidential and/or prioritized assets of the one or more networks based at least in part on the monitoring of the network structure of the one or more networks. In certain embodiments, the cloud-based network monitoring system is configured to continuously monitor a network structure of one or more networks, and to automatically rearrange the network structure of the one or more networks to protect confidential and/or prioritized assets of the one or more networks based at least in part on the continuous monitoring of the network structure of the one or more networks.

20 Claims, 6 Drawing Sheets

CLOUD-BASED COMPUTING NETWORK STRUCTURING SYSTEMS AND METHODS

CROSS-REFERENCES TO RELATED APPLICATIONS

The present application is a continuation of U.S. patent application Ser. No. 17/330,891, titled "Cloud-Based Computing Network Structuring Systems and Methods," which was filed on May 26, 2021, and which claims benefit of and priority to U.S. Provisional Patent Application Ser. No. 63/031,735, titled "Cloud-Based Computing Network Structuring," which was filed on May 29, 2020, both of which are herein incorporated by reference in their entireties for all purposes.

BACKGROUND

The present disclosure relates generally to systems and methods for rearranging, using a cloud-based network monitoring system, a structure of a network to protect confidential and/or prioritized assets.

The number and variety of network-compatible computing devices has increased greatly in recent years with the advent of "smart" devices. However, the increased number of computing devices connected to a network increases the risks of network security breaches. For example, some "smart" devices (e.g., Internet of Things (IoT) devices) may be subject to malicious software attacks and gain access to secure information from other computing devices (e.g., computers and smartphones). As such, improvements in network security that take into account the varied operations of network-compatible computing devices are desirable.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Embodiments of the present disclosure include systems and methods for continuously monitoring a network structure (i.e., network topology) of one or more networks using a cloud-based network monitoring system, and rearranging, using the cloud-based network monitoring system, the network structure of the one or more networks to protect confidential and/or prioritized assets of the one or more networks based at least in part on the continuous monitoring of the network structure of the one or more networks.

In certain embodiments, a cloud-based network security structuring system includes a cloud-based network monitoring system configured to continuously monitor a network structure of one or more networks, and to automatically rearrange the network structure of the one or more networks to protect confidential and/or prioritized assets of the one or more networks based at least in part on the continuous monitoring of the network structure of the one or more networks.

In addition, in certain embodiments, a method includes continuously monitoring a network structure of one or more networks using a cloud-based network monitoring system. In addition, the method includes automatically rearranging, using the cloud-based network monitoring system, the network structure of the one or more networks to protect confidential and/or prioritized assets of the one or more networks based at least in part on the continuous monitoring of the network structure of the one or more networks.

In addition, in certain embodiments, a method includes continuously monitoring a network structure of one or more networks using a cloud-based network monitoring system to automatically identify one or more network branches of the one or more networks, and to automatically identify one or more computing devices of the one or more networks. The one or more computing devices include Internet of Things devices. The method also includes automatically rearranging, using the cloud-based network monitoring system, the network structure of the one or more networks to protect confidential and/or prioritized assets of the one or more networks based at least in part on the identified one or more network branches of the one or more networks and based at least in part on a security level of the identified one or more computing devices of the one or more networks.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
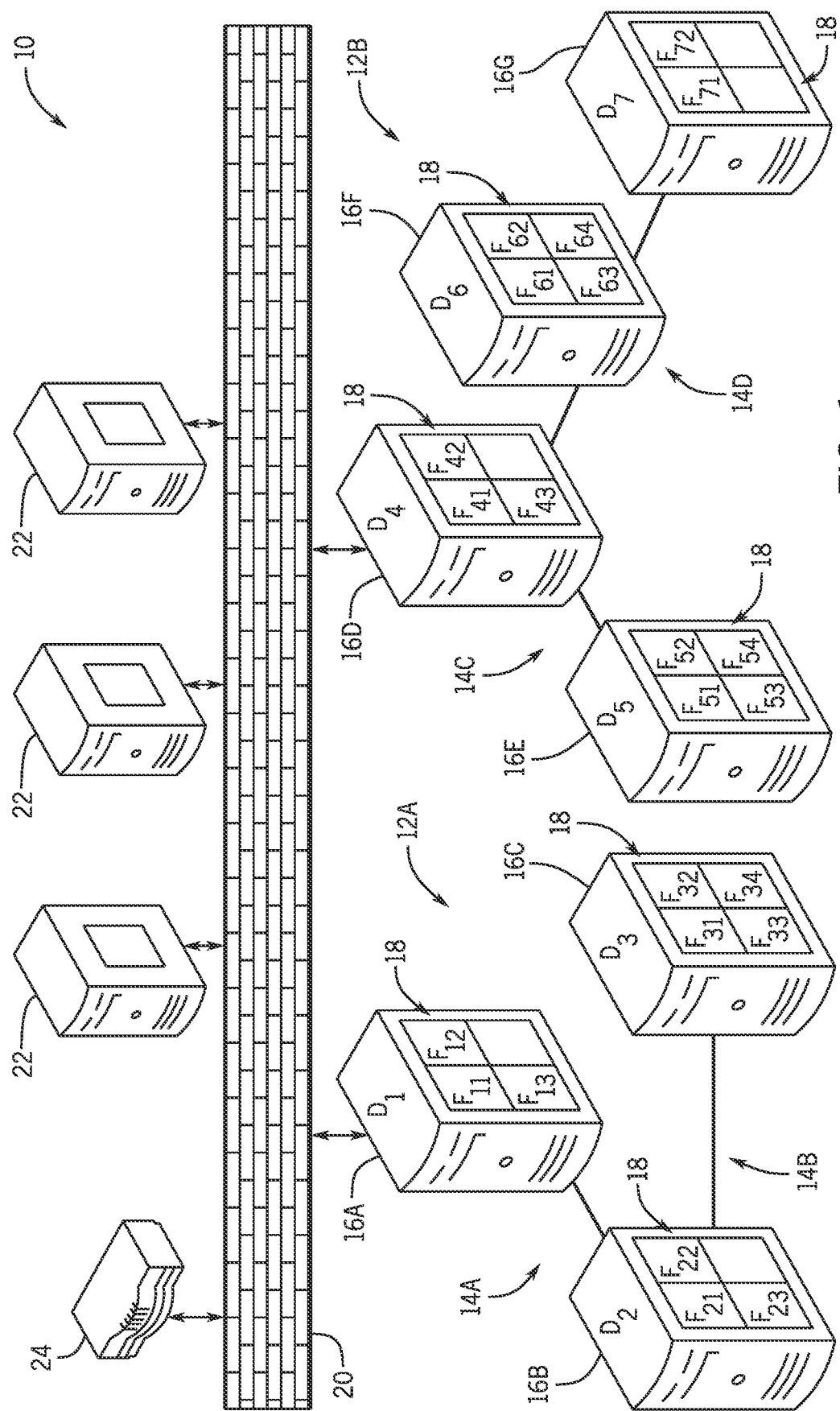
FIG. 1 is a schematic diagram of a cloud-based network security structuring system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the term "cloud-based" may refer to functionality that is performed by a plurality of decentralized computing resources (e.g., computing devices) that function collectively, and that are accessible via the Internet as a collective group of computing resources. For example, a cloud-based computing system may provide computing functionality to users regardless of whether any particular computing resource is available. Rather, even when certain computing resources are replaced by other computing resources, the collective group of computing resources still provide computing functionality to users. In addition, a cloud-based computing system comprised of a plurality of computing resources may provide computing functionality to users even when Internet access to any particular computing resource is unavailable. Accordingly, cloud-based computing systems tend to provide enhanced availability through inherent redundancy of computing resources.

As used herein, terms "continuous" and "continuously" may refer to ongoing (e.g., iterative) actions that are performed without interruption or are performed with interruptions that take no longer than a relatively short period of time, such as no longer than a 5-second interruption between the ongoing actions, no longer than a 1-second interruption between the ongoing actions, and so forth. For example, continuous ongoing actions may be performed in an iterative manner such that there is no appreciable (e.g., human-perceivable) interruption of the iterative actions.

As used herein, the terms "automatic" and "automatically" may refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

Various embodiments of the present disclosure generally relate to systems and methods for rearranging, using a cloud-based network monitoring system, a structure of a network to protect confidential and/or prioritized assets. For example, embodiments are described herein for systems and methods for continuously monitoring a network structure of one or more networks using a cloud-based network monitoring system, and automatically rearranging, using the cloud-based network monitoring system, the network structure of the one or more networks to protect confidential and/or prioritized assets of the one or more networks based at least in part on the continuous monitoring of the network structure of the one or more networks.

In particular, the embodiments described herein provide a cloud computing model that observes network structure and security settings of a network to be protected. Through such observations, the cloud computing network may automatically identify branches of the network, content of the branches of the network, devices that are a part of the network, firewalls of the network, and other aspects of the network (e.g., which files are confidential and/or high priority). Based on such observations, the cloud computing model may suggest and/or automatically implement structuring of the network based on an algorithm, template, or criteria that emphasizes protection of confidential/high priority branches, devices, and files within the network. For example, the cloud computing model may automatically rearrange the network such that certain network branches are located behind multiple firewalls and adjust the distribution of the networks. For example, the least secure devices on the network may be moved behind existing firewalls. Furthermore, certain devices/files (e.g., Device A and Device B) may be identified as security risks (e.g., based on content contained in the devices/files, explicit security levels of the devices/files, operational settings of the devices, type of the devices, and so forth) when resident in the same area of the network because the likelihood of hacking is increased. Thus, for example, the cloud computing model may automatically adjust the network to put device A on a different network from device B. Basically, the network may be set up such that, if a device/file is sensitive, it is rerouted to a network that has less security risk. Furthermore, the network may be distributed such that, for example, not all IoT devices are on a single network.

The rearranging and restructuring of networks described herein is not generally intended to mean rearranging and restructuring physical connections between the network assets described herein. Rather, in certain embodiments, the rearranging and restructuring of the networks described herein may be automatically performed by a cloud-based network security structuring system by, for example, adjusting network settings (e.g., firewall settings, port settings, Internet protocol (IP) settings, and so forth) for the network assets and/or moving files between devices to ensure that the network assets are located on the same or different networks based on the confidential and/or prioritized status of the network assets, which is continuously monitored by the cloud-based network security structuring system while the cloud-based network security structuring system is operating. However, in other embodiments, the cloud-based network security structuring system may instead (or additionally) make recommendations to users of the cloud-based network security structuring system to physically rearrange or restructure physical connections between the network assets to provide even further enhanced security. In certain embodiments, the cloud-based network security structuring system may be a subscription-based system with which certain network assets described herein may be registered for the purpose of being continuously monitored by the cloud-based network security structuring system.

In addition, the cloud-based functionality of the network security structuring system described herein enables rearranging and restructuring of networks regardless of a physical location of the cloud-based network security structuring system relative to the network assets that are continuously monitored by the cloud-based network security structuring system, which enables decentralized monitoring, rearranging, and restructuring of the networks. In addition, the cloud-based nature of the network security structuring system described herein enables continuous monitoring of the networks, regardless of particular network outages and/or interruption of communication access (e.g., due to loss on Internet access). As such, the security of the monitored networks may be automatically enhanced by the cloud-based network security structuring system continuously over time without requiring human intervention.

FIG. 1 is a schematic diagram of a cloud-based network security structuring system 10. As illustrated in FIG. 1, the cloud-based network security structuring system 10 may be used to rearrange one or more protected networks 12, each of which may include network branches 14 including computing devices 16 and computer files 18 stored in the computer devices 16. As illustrated in FIG. 1, the cloud-based network security structuring system 10 may include one or more firewalls 20, which monitor and control data between external devices 22 and the one or more protected networks 12.

In addition, as also illustrated in FIG. 1, the cloud-based network security structuring system 10 may include a cloud-based network monitoring system 24 configured to continuously monitor the network structure of the one or more protected networks 12, and to automatically (e.g., without human intervention) rearrange the network structure of the one or more protected networks 12 to protect confidential and/or prioritized computing devices 16 and/or confidential and/or prioritized computer files 18 (e.g., collectively referred to as network assets) of the one or more protected networks 12 based at least in part on the continuous monitoring of the network structure of the one or more protected networks 12. Alternatively, in certain embodiments, the cloud-based network monitoring system 24 may be configured to continuously monitor the network structure of the one or more protected networks 12, and to automatically generate recommendations to rearrange the network structure of the one or more protected networks 12 to protect confidential and/or prioritized computing devices 16 and/or confidential and/or prioritized computer files 18 of the one or more protected networks 12 based at least in part on the continuous monitoring of the network structure of the one or more protected networks 12. In such embodiments, the cloud-based network monitoring system 24 may automatically transmit such recommendations to computing devices 16, which may display the recommendations via displays of the computing devices 16.

For example, as described in greater detail herein, in certain embodiments, the cloud-based network monitoring system 24 may be configured to automatically identify network branches 14, computing devices 16, and computer files 18 that are a part of the protected networks 12 to determine the network structure of the protected networks 12, and may automatically rearrange the network structure of the one or more protected networks 12 based at least in part on the determined network structure. For example, in certain embodiments, the cloud-based network monitoring system 24 may be configured to automatically rearrange the network structure of the one or more protected networks 12 based at least in part on a security level of the identified computing devices 16 of the one or more protected networks 12 and/or a confidentiality level and/or a priority level of the computer files 18 stored in the one or more protected networks 12. In certain embodiments, the confidentiality level and/or the priority level of the computer files 18 may be automatically determined by the cloud-based network monitoring system 24 based on the cloud-based network monitoring system 24 analyzing content of the computer files 18 (e.g., data contained in the computer files 18), determining explicit confidentiality levels and/or priority levels (e.g., which have been established by users) of the computer files 18, and so forth.

For example, in certain embodiments, the cloud-based network monitoring system 24 may be configured to automatically rearrange the network structure of the one or more protected networks 12 by moving one or more network branches 14 of the one or more protected networks 12, moving access to one or more computing devices 16 of the one or more protected networks 12, and/or moving one of more computer files 18 stored in the one or more protected networks 12 behind at least one firewall 20. In addition, in certain embodiments, the cloud-based network monitoring system 24 may be configured to change settings of at least one firewall 20 to, for example, establish firewall partitions of the at least on firewall 20 behind which one or more network branches 14 of the one or more protected networks 12, one or more computing devices 16 of the one or more protected networks 12, and/or one of more computer files 18 stored in the one or more protected networks 12 may be moved upon observance by the cloud-based network monitoring system 24 that the particular network assets are relatively highly confidential and/or of relatively high prioritization (e.g., as compared to other computing devices 16 of the one or more protected networks 12).

In addition, in certain embodiments, the cloud-based network monitoring system 24 may be configured to automatically rearrange the network structure of the one or more protected networks 12 by moving access to certain computing devices 16 to a new (e.g., more secure) protected network 12 upon observance that the computing devices 16, for example, have a relatively high security level and/or that the computing devices 16 are a particular type of device (e.g., a particular type of IoT device, as described herein) and/or that the computing devices 16 are configured with particular operational settings (e.g., an IoT device having a particular operational setting, such as what type of external data can the IoT device access, what types of external devices have access to the IoT device, and so forth). Similarly, in certain embodiments, the cloud-based network monitoring system 24 may be configured to automatically rearrange the network structure of the one or more protected networks 12 by moving certain computer files 18 to a new (e.g., more secure) protected network 12 upon observance that the computer files 18, for example, have a relatively high confidentiality level and/or a relatively high priority level (e.g., as compared to other computer files 18 stored in the one or more protected networks 12).

As used herein, moving access to certain computing devices 16 may refer to moving network access nodes within the protected networks 12 (or within network branches 14 that make up the protected networks 12) such that access to the computing devices 16 may be minimized, if not entirely prevented. Specifically, in general, the computing devices 16 are not physically moved to different locations. Rather, it is the network access nodes, from a network topology standpoint, that are moved.

Figure 2:
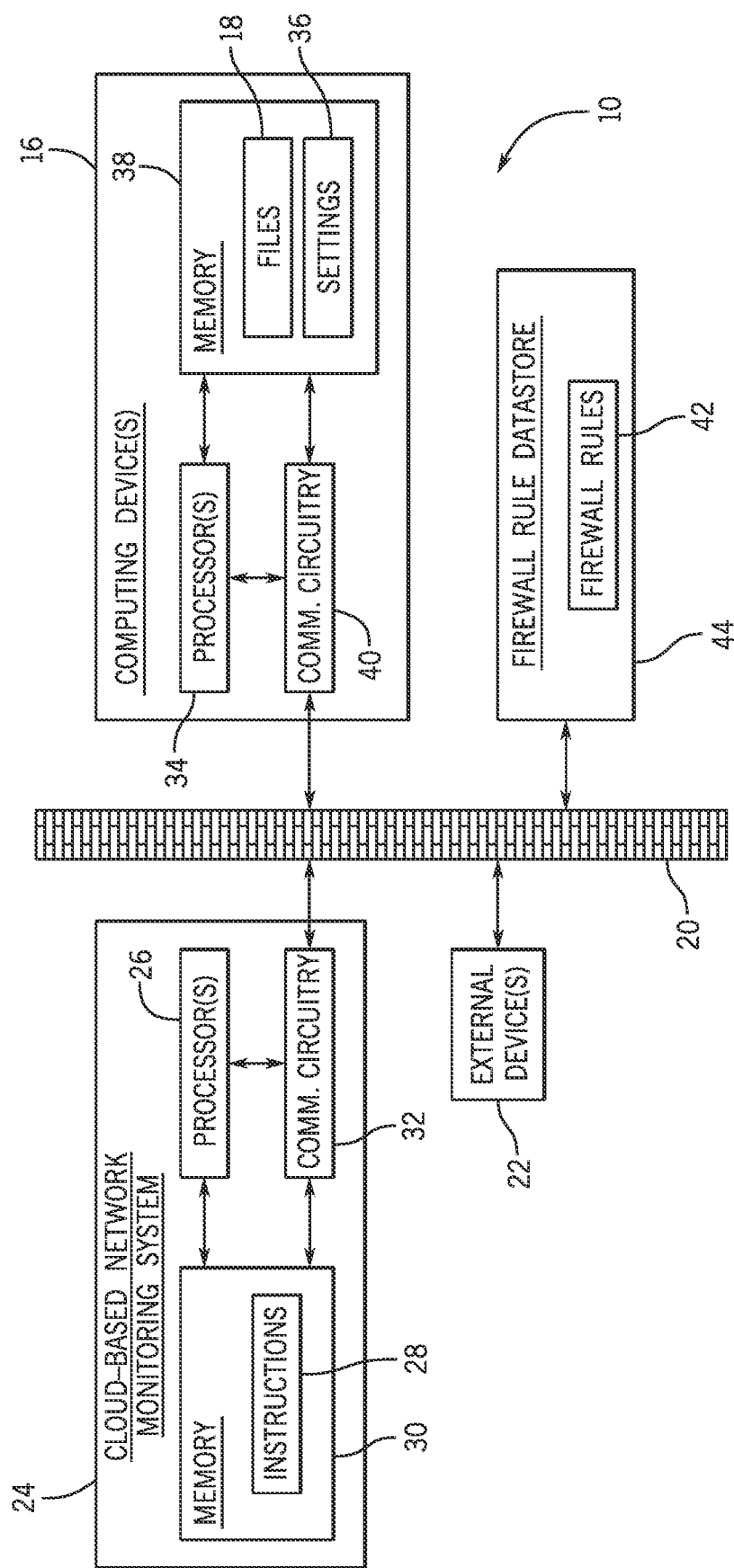
FIG. 2 is a schematic diagram of components of the cloud-based network security structuring system of FIG. 1, in accordance with embodiments described herein.

FIG. 2 is a schematic diagram of components of the cloud-based network security structuring system 10 of FIG. 1. As illustrated in FIG. 2, in certain embodiments, the cloud-based network monitoring system 24 may include at least one processor 26 configured to execute instructions 28 stored in at least one memory medium 30 of the cloud-based network monitoring system 24, wherein the instructions 28, when executed by the at least one processor 26, enable the cloud-based network monitoring system 24 to perform the cloud-based network security structuring functions described in greater detail herein. In addition, as also illustrated in FIG. 2, in certain embodiments, the cloud-based network monitoring system 24 includes communication circuitry 32 configured to communicate with all of the other components of the cloud-based network security structuring system 10 to, for example, continuously monitor the network structure of the protected networks 12 described herein, as well as to automatically rearrange the network structure of the protected networks 12 as described in greater detail herein. Although illustrated in FIGS. 1-5 as being a single computing device, it will be appreciated that the cloud-based network monitoring system 24 may, in fact, include multiple computing devices that function together as a cloud-based model.

As also illustrated in FIG. 2, in certain embodiments, the computing devices 16 that comprise the protected networks 12 described herein may include at least one processor 34 configured to access computer files 18 and various operational settings 36 (e.g., including network settings) stored in at least one memory medium 38 of the computing devices 16. In addition, as also illustrated in FIG. 2, in certain embodiments, the computing devices 16 include communication circuitry 40 configured to communicate with some or all of the other components of the cloud-based network security structuring system 10 to, for example, be continuously monitored by the cloud-based network monitoring system 24, as well as enabling computer files 18 to moved from one computing device 16 to another computing device 16 by the cloud-based network monitoring system 24, enabling adjustment of operational settings 36 (e.g., including network settings) of the computing devices 16 by the cloud-based network monitoring system 24, and so forth, as described in greater detail herein.

As illustrated in FIGS. 1 and 3-5, in certain embodiments, the computing devices 16 may include, but are not limited to, smart home devices and/or other IoT devices including one or more of the following types of IoT devices:

smart appliances 16A, such as washers, dryers, refrigerators, ovens, dishwashers, and so forth;

home entertainment systems 16B, such as televisions, audio systems, game consoles, media players, and so forth;

in-home control systems 16C, such as garage door openers, alarm systems, security systems (e.g., security lights, security cameras, locks, and so forth), safety systems (e.g., smoke detectors, carbon monoxide detectors, and so forth), and other smart home systems (e.g., windows, chimney flues, and so forth);

lighting devices 16D, such as lamps, fixtures, and so forth;

utility systems 16E that provide and/or control electric power, natural gas, water, sewage, heating, ventilation, and air conditioning (HVAC), network access, and so forth, such as HVAC units, thermostats, vents, water meters, water heaters, gas meters, electrical switch boxes, circuit breaker boxes, and so forth; and/or portable or less portable computing devices 16F, such as smartphones, tablet computers, electronic book readers, laptop computers, desktop computers, television set-top boxes, in-vehicle automotive computers or telematics devices, and so forth.

The element numbering illustrated with respect to the computing devices 16 illustrated in FIGS. 1 and 3-5 is intended to be exemplary, and it not intended to be limiting. Indeed, the computing devices 16 illustrated in FIGS. 1 and 3-5 may be any type of computing devices 16 that may make up the protected networks 12 described herein.

Returning now to FIG. 2, in certain embodiments, the firewalls 20 described herein may access firewall rules 42 stored in a firewall rule datastore 44 in order to establish the firewall functionality of the firewalls 20. In general, the firewall rules 42 may provide an indication of particular type and/or source of electronic data that is required for access to the network assets of the protected networks 12 described herein. In this manner, the firewalls 20 described herein may use the firewall rules 42 to block access attempts to certain external devices 22 when the required electronic data is not provided. In addition, the cloud-based network monitoring system 24 may adjust the firewall rules 42 stored in the firewall rule datastore 44 based on the continuous monitoring performed by the firewall rules 42 stored in a firewall rule datastore 44 described in greater detail herein.

Figure 3:
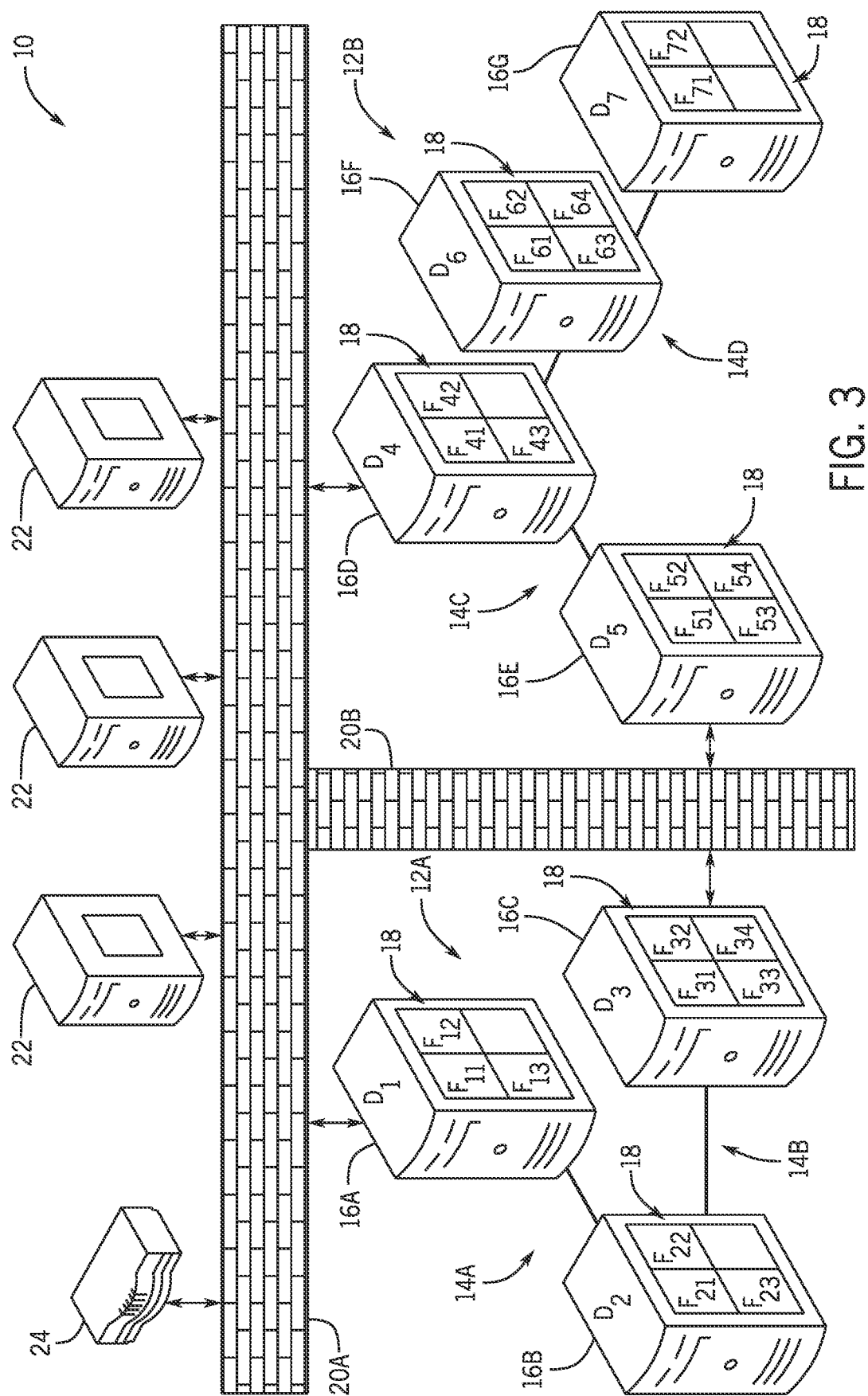
FIG. 3 is a schematic diagram of the cloud-based network security structuring system of FIG. 1 where a secondary firewall has been established by the cloud-based network security structuring system, in accordance with embodiments described herein.

Returning now to FIG. 1, in certain embodiments, the cloud-based network monitoring system 24 may continuously monitor and analyze the network structure of one or more protected networks 12, and may automatically rearrange the network structure of the one or more protected networks 12 such that certain networks branches 14 and/or certain computing devices 16 are located behind multiple firewalls 20, and/or may adjust the distribution of the one or more protected networks 12. For example, as illustrated in FIG. 3, if the cloud-based network monitoring system 24 determines that the computing devices 16 in a second protected network 12B are currently less secure than the computing devices 16 in a first protected network 12A, the cloud-based network monitoring system 24 may automatically (e.g., without human intervention) establish a secondary firewall 20B between the first and second protected networks 12A, 12B such that the computing devices 16 of the second protected network 12B are located behind a primary firewall 20A and the secondary firewall 20B, whereas the computing devices 16 of the first protected network 12A remain located behind only the primary firewall 20A.

Figure 4:
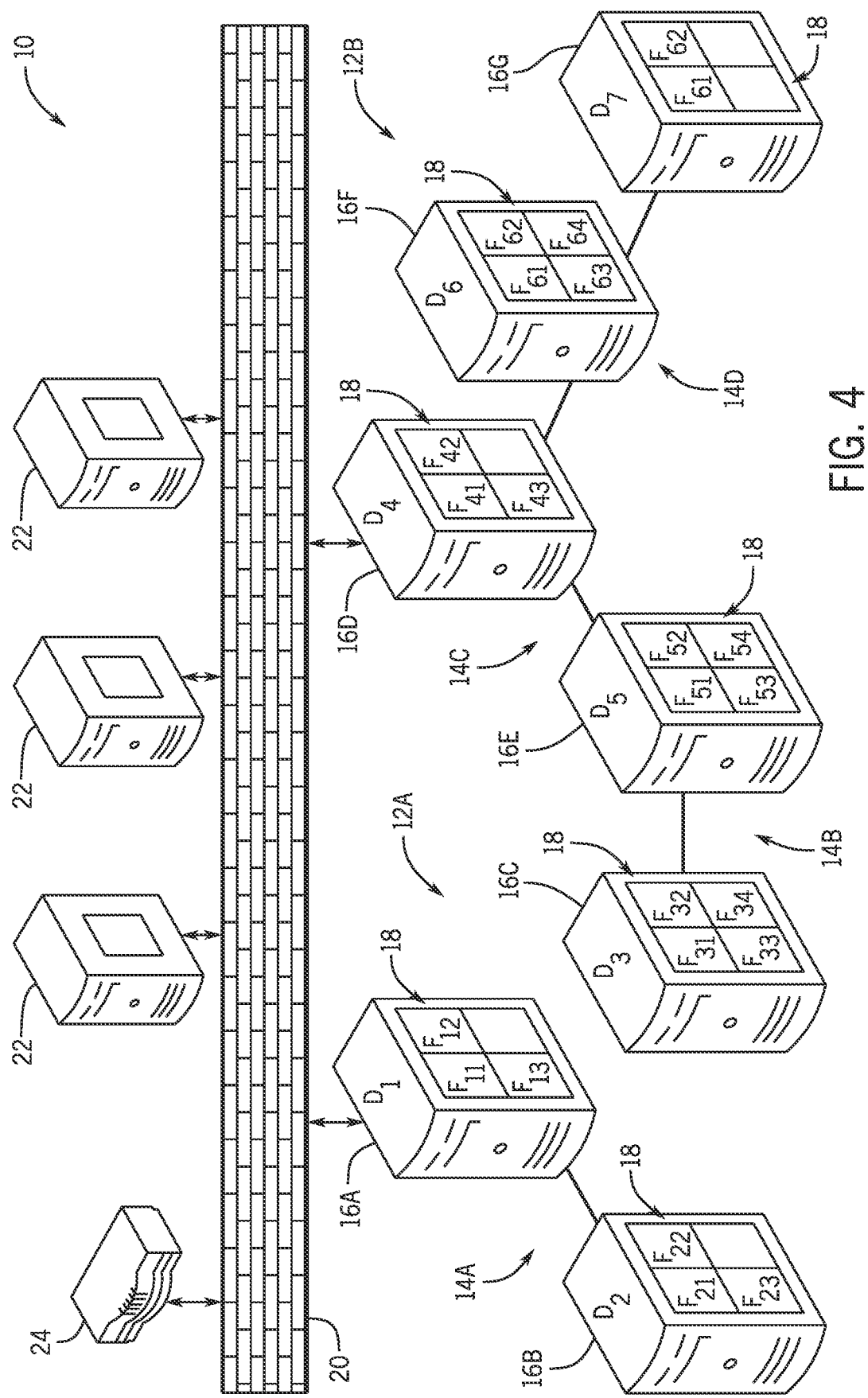
FIG. 4 is a schematic diagram of the cloud-based network security structuring system of FIG. 1 where a computing device has been moved to a different protected network by the cloud-based network security structuring system, in accordance with embodiments described herein.

In addition, in certain embodiments, the cloud-based network monitoring system 24 may continuously monitor and analyze the network structure of one or more protected networks 12, and may automatically rearrange the network structure of the one or more protected networks 12 such that certain networks branches 14 and/or certain computing devices 16 are moved to different protected networks 12. For example, if certain networks branches 14 and/or certain computing devices 16 are identified by the cloud-based network monitoring system 24 as security risks because they are located in the same protected network 12 and, therefore, have a relatively higher likelihood of being hacked, the cloud-based network monitoring system 24 may move some of the networks branches 14 and/or computing devices 16 to different protected networks 12 to reduce the security risks. As but one non-limiting example, as illustrated in FIG. 4, if the cloud-based network monitoring system 24 determines that having a first computing device 16B and a second computing device 16C located in a first protected network 12A increases the security risks of these computing devices 16B, 16C, the cloud-based network monitoring system 24 may automatically (e.g., without human intervention) adjust network routing settings of the protected networks 12A, 12B to move the second computing device 16C (and/or an entire associated network branch 14B) to a second protected network 12B from a network topology perspective such that the first and second computing devices 16B, 16C are located in different protected networks 12A, 12B. As another non-limiting example, in certain embodiments, the cloud-based network monitoring system 24 may distribute the network assets of the protected networks 12 such that not all computing devices 16 (e.g., IoT devices) are on a single protected network 12 but, rather, are distributed among different protected networks 12.

Figure 5:
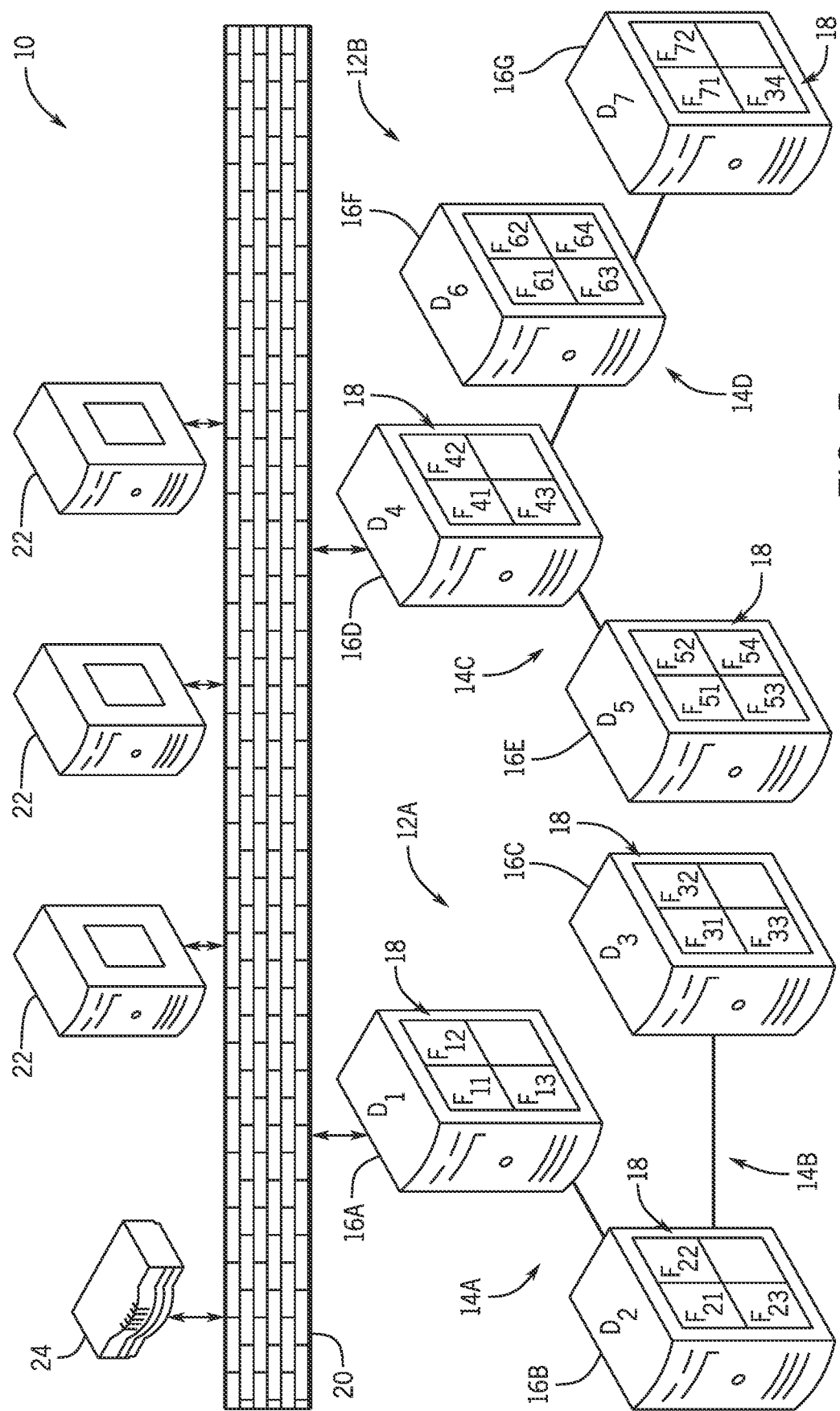
FIG. 5 is a schematic diagram of the cloud-based network security structuring system of FIG. 1 where a computer file has been moved to a different computing device of a different protected network by the cloud-based network security structuring system, in accordance with embodiments described herein.

In addition, in certain embodiments, the cloud-based network monitoring system 24 may continuously monitor and analyze the network structure of one or more protected networks 12, and may automatically rearrange the network structure of the one or more protected networks 12 such that certain computer files 18 are moved to a different protected network 12. For example, if certain computer files 18 are identified by the cloud-based network monitoring system 24 as relatively higher confidentiality levels and/or priority levels (e.g., as compared to other computer files 18), the cloud-based network monitoring system 24 may move such computer files 18 to different protected networks 12 to improve the security of these particular computer files 18. As but one non-limiting example, as illustrated in FIG. 5, if the cloud-based network monitoring system 24 determines that a computer file 18 (e.g., designated by $F_{34}$ in FIG. 5) stored on a first computing device 16C in a first protected network 12A has a relatively higher confidentiality level and/or priority level (e.g., as compared to other computer files 18), the cloud-based network monitoring system 24 may automatically (e.g., without human intervention) move the computer file 18 to a second computing device 16G in a second protected network 12B (e.g., having a relatively higher security level as compared to the first protected network 12A).

It will be appreciated that each of the network structuring techniques described above with respect to FIGS. 1 and 3-5 may be implemented together by the cloud-based network monitoring system 24 in any combination. In general, the cloud-based network monitoring system 24 may automatically (e.g., without human intervention) structure one or more protected networks 12 such that, if any of the network assets are determined by the cloud-based network monitoring system 24 to be relatively sensitive, those network assets may be rearranged within the one or more protected networks 12 to increase the security of the network assets.

Figure 6:
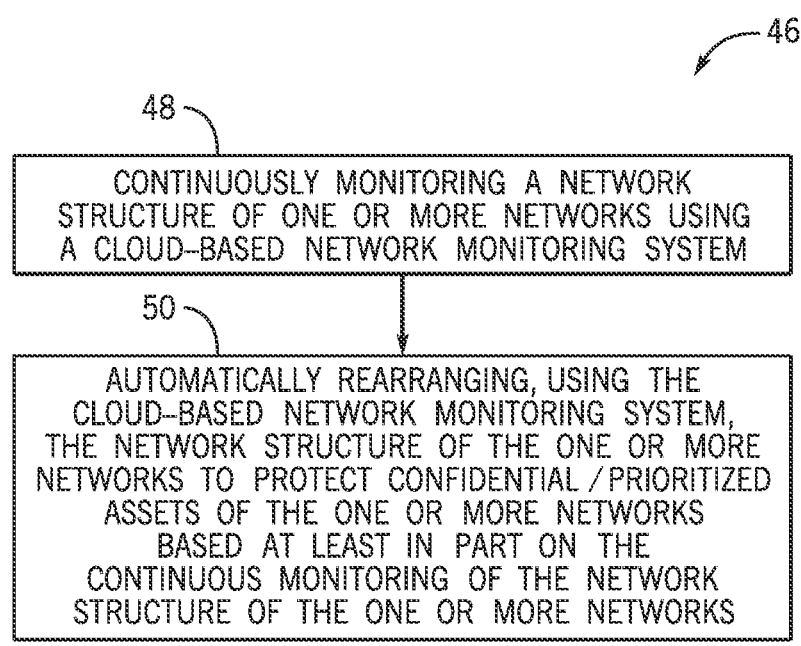
FIG. 6 is a flow diagram of a method of operating the cloud-based network security structuring system of FIGS. 1-5, in accordance with embodiments described herein.

FIG. 6 is a flow diagram of a method 46 of operating the cloud-based network security structuring system 10 of FIGS. 1-5. As illustrated in FIG. 6, in certain embodiments, the method 46 may include continuously monitoring a network structure of one or more networks 12 using a cloud-based network monitoring system 24 (block 48). In addition, in certain embodiments, the method 46 may include automatically rearranging, using the cloud-based network monitoring system 24, the network structure of the one or more networks 12 to protect confidential and/or prioritized assets 16, 18 of the one or more networks 12 based at least in part on the continuous monitoring of the network structure of the one or more networks 12 (block 50).

In addition, in certain embodiments, the method 46 may include using the cloud-based network monitoring system 24 to automatically identify network branches 14 of the one or more networks 12, and to automatically rearrange the network structure of the one or more networks 12 based at least in part on the identified network branches 14 of the one or more networks 12.

In addition, in certain embodiments, the method 46 may include using the cloud-based network monitoring system 24 to automatically identify computing devices 16 of the one or more networks 12, and to automatically rearrange the network structure of the one or more networks 12 based at least in part on the identified computing devices 16 of the one or more networks 12. In addition, in certain embodiments, the method 46 may include using the cloud-based network monitoring system 24 to automatically rearrange the network structure of the one or more networks 12 based at least in part on a security level of the identified computing devices 16 of the one or more networks 12 and/or a particular type of the identified computing devices 16 (e.g., a particular type of IoT device, as described herein) and/or a particular operational setting 36 of the identified computing devices 16 (e.g., an IoT device having a particular operational setting 36, such as what type of external data can the IoT device access, what types of external devices have access to the IoT device, and so forth).

In addition, in certain embodiments, the method 46 may include using the cloud-based network monitoring system 24 to automatically identify computer files 18 stored in the one or more networks 12, and to automatically rearrange the network structure of the one or more networks 12 based at least in part on the identified computer files 18 stored in the one or more networks 12. In addition, in certain embodiments, the method 46 may include using the cloud-based network monitoring system 24 to automatically rearrange the network structure of the one or more networks 12 based at least in part on a confidentiality level and/or a priority level of the computer files 18 stored in the one or more networks 12.

In addition, in certain embodiments, the method 46 may include using the cloud-based network monitoring system 24 to automatically rearrange the network structure of the one or more networks 12 by moving one or more network branches 14 of the one or more networks 12, one or more computing devices 16 of the one or more networks 12, or one of more computer files 18 stored in the one or more networks 12 behind at least one firewall 20 of the one or more networks 12.

In addition, in certain embodiments, the method 46 may include using the cloud-based network monitoring system 24 to automatically rearrange the network structure of the one or more networks 12 by moving access to a first computing device 16B of the one or more networks 12 to a first network 12A of the one or more networks 12 and moving access to a second computing device 16C of the one or more networks 12 to a second network 12B of the one or more networks 12. In addition, in certain embodiments, the method 46 may include moving access to the first computing device 16B of the one or more networks 12 to the first network 12A of the one or more networks 12 and moving access to the second computing device 16C of the one or more networks 12 to the second network 12B of the one or more networks 12 based at least in part on a relative security level between the first and second computing devices 16 and/or a comparison of the particular types of the first and second computing devices 16 (e.g., that the first computing device 16 is a first type of IoT device and the second computing device 16 is a second type of IoT device, as described herein). As but a few non-limiting examples, in certain embodiments, it may be undesirable to have certain types of smart appliances 16A on the same network 12, or it may be undesirable to have certain types of smart appliances 16A on the same network 12 as certain types of utility systems 16E.

In addition, in certain embodiments, the method 46 may include using the cloud-based network monitoring system 24 to automatically rearrange the network structure of the one or more networks 12 by moving a first computer file 18 stored in the one or more networks 12 to a first network 12A of the one or more networks 12 and moving a second computer file 18 stored in the one or more networks 12 to a second network 12B of the one or more networks 12. In addition, in certain embodiments, the method 46 may include moving the first computer file 18 stored in the one or more networks 12 to the first network 12A of the one or more networks 12 and moving the second computer file 18 stored in the one or more networks 12 to the second network 12B of the one or more networks 12 based at least in part on a relative confidentiality level and/or a relative priority level between the first and second computer files 18.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A system, comprising:
a plurality of decentralized computing devices configured to:
continuously monitor a network structure of one or more networks remotely as a cloud-based group of computing resources; and
automatically rearrange the network structure of the one or more networks to protect confidential and/or prioritized assets of the one or more networks by automatically moving one or more computer files from a first network of the one or more networks to a second network of the one or more networks based at least in part on a relative confidentiality level and/or a relative priority level of the one or more computer files.

2. The system of claim 1, wherein the plurality of decentralized computing devices is configured to automatically rearrange the network structure of the one or more networks based at least in part on content contained in the one or more computer files.

3. The system of claim 1, wherein the plurality of decentralized computing devices is configured to automatically rearrange the network structure of the one or more networks by automatically moving one or more network branches of the one or more networks.

4. The system of claim 1, wherein the plurality of decentralized computing devices is configured to automatically rearrange the network structure of the one or more networks by automatically moving at least one computer file of the one of more computer files behind at least one firewall of the one or more networks.

5. The system of claim 1, wherein the plurality of decentralized computing devices is configured to automatically identify one or more computing devices of the one or more networks, and to automatically rearrange the network structure of the one or more networks based at least in part on a security level of the identified one or more computing devices of the one or more networks.

6. The system of claim 1, wherein the plurality of decentralized computing devices is configured to automatically rearrange the network structure of the one or more networks by automatically moving access to a first computing device of the one or more networks to the first network of the one or more networks and moving access to a second computing device of the one or more networks to the second network of the one or more networks.

7. The system of claim 6, wherein automatically moving access to the first computing device of the one or more networks to the first network of the one or more networks and moving access to the second computing device of the one or more networks to the second network of the one or more networks is based at least in part on a relative security level between the first and second computing devices.

8. A method, comprising:
continuously monitoring a network structure of one or more networks remotely using a plurality of decentralized computing devices as a cloud-based group of computing resources; and
automatically rearranging, using the plurality of decentralized computing devices, the network structure of the one or more networks to protect confidential and/or prioritized assets of the one or more networks by automatically moving one or more computer files from a first network of the one or more networks to a second network of the one or more networks based at least in part on a relative confidentiality level and/or a relative priority level of the one or more computer files.

9. The method of claim 8, comprising automatically rearranging, using the plurality of decentralized computing devices, the network structure of the one or more networks based at least in part on content contained in the one or more computer files.

10. The method of claim 8, comprising automatically rearranging, using the plurality of decentralized computing devices, the network structure of the one or more networks by automatically moving one or more network branches of the one or more networks.

11. The method of claim 8, comprising automatically rearranging, using the plurality of decentralized computing devices, the network structure of the one or more networks by automatically moving at least one computer file of the one of more computer files behind at least one firewall of the one or more networks.

12. The method of claim 8, comprising:
automatically identifying, using the plurality of decentralized computing devices, one or more computing devices of the one or more networks; and
automatically rearranging, using the plurality of decentralized computing devices, the network structure of the one or more networks based at least in part on a security level of the identified one or more computing devices of the one or more networks.

13. The method of claim 8, comprising automatically rearranging, using the plurality of decentralized computing devices, the network structure of the one or more networks by automatically moving access to a first computing device of the one or more networks to the first network of the one or more networks and moving access to a second computing device of the one or more networks to the second network of the one or more networks.

14. The method of claim 13, wherein automatically moving access to the first computing device of the one or more networks to the first network of the one or more networks and moving access to the second computing device of the one or more networks to the second network of the one or more networks is based at least in part on a relative security level between the first and second computing devices.

15. A plurality of decentralized computing devices configured to:
continuously monitor a network structure of one or more networks remotely as a cloud-based group of computing resources; and
automatically rearrange the network structure of the one or more networks to protect confidential and/or prioritized assets of the one or more networks by automatically moving one or more computer files from a first network of the one or more networks to a second network of the one or more networks based at least in part on a relative confidentiality level and/or a relative priority level of the one or more computer files and based at least in part on content contained in the one or more computer files.

16. The plurality of decentralized computing devices of claim 15, wherein the plurality of decentralized computing devices is configured to automatically rearrange the network structure of the one or more networks by automatically moving one or more network branches of the one or more networks.

17. The plurality of decentralized computing devices of claim 15, wherein the plurality of decentralized computing devices is configured to automatically rearrange the network structure of the one or more networks by automatically moving at least one computer file of the one of more computer files behind at least one firewall of the one or more networks.

18. The plurality of decentralized computing devices of claim 15, wherein the plurality of decentralized computing devices is configured to automatically identify one or more computing devices of the one or more networks, and to automatically rearrange the network structure of the one or more networks based at least in part on a security level of the identified one or more computing devices of the one or more networks.

19. The plurality of decentralized computing devices of claim 15, wherein the plurality of decentralized computing devices is configured to automatically rearrange the network structure of the one or more networks by automatically moving access to a first computing device of the one or more networks to the first network of the one or more networks and moving access to a second computing device of the one or more networks to the second network of the one or more networks.

20. The plurality of decentralized computing devices of claim 19, wherein automatically moving access to the first computing device of the one or more networks to the first network of the one or more networks and moving access to the second computing device of the one or more networks to the second network of the one or more networks is based at least in part on a relative security level between the first and second computing devices.

* * * * *